(12) United States Patent
Eagerton

(10) Patent No.: US 10,705,260 B2
(45) Date of Patent: Jul. 7, 2020

(54) HARD MULTI-COAT ON OPTICAL ARTICLE

(71) Applicant: ESSILOR INTERNATIONAL, Charenton-le-Pont (FR)

(72) Inventor: William Eagerton, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 16/062,780

(22) PCT Filed: Dec. 16, 2016

(86) PCT No.: PCT/EP2016/081533
§ 371 (c)(1),
(2) Date: Jun. 15, 2018

(87) PCT Pub. No.: WO2017/103177
PCT Pub. Date: Jun. 22, 2017

(65) Prior Publication Data
US 2019/0227196 A1    Jul. 25, 2019

Related U.S. Application Data

(60) Provisional application No. 62/269,078, filed on Dec. 17, 2015.

(51) Int. Cl.
*G02B 1/14* (2015.01)
*G02C 1/00* (2006.01)
(Continued)

(52) U.S. Cl.
CPC ............. *G02B 1/14* (2015.01); *B05D 1/18* (2013.01); *B05D 3/12* (2013.01); *C01B 32/158* (2017.08); *G02C 1/00* (2013.01)

(58) Field of Classification Search
CPC .... G02B 1/14; B05D 3/12; B05D 1/18; C01B 32/158; C01B 32/182; C01B 32/20; G02C 1/00
See application file for complete search history.

(56) References Cited

U.S. PATENT DOCUMENTS 5,190,807 A  *  3/1993  Kimock ................ C23C 16/006
                                                              428/216
8,722,442 B2    5/2014  Kim et al.
(Continued)

FOREIGN PATENT DOCUMENTS

CN         102422181         4/2012
CN         104503015         4/2015
(Continued)

OTHER PUBLICATIONS

Written Opinion dated Apr. 18, 2017 in priority PCT Application No. PCT/EP2016/081533.
(Continued)

*Primary Examiner* — Kimberly N. Kakalec
(74) *Attorney, Agent, or Firm* — Norton Rose Fulbright US LLP

(57) ABSTRACT

An optical device and method for manufacturing the optical device is provided. The optical device comprises an optical article having a substrate, a primer layer, and a hard multi-coat (HMC). The HMC comprises at least one layer. At least one of the layers, the substrate, and the HMC comprises at least one carbon allotrope that is absorbed by diffusion. The method of manufacturing involves combining and organic solvent and deionized water to form a solution, mixing into the solution at least one carbon allotrope, applying sonication to the solution an optical article comprising at least one of a substrate, a primer layer on the substrate, and a HMC, immersing and then withdrawing the optical article from the solution, withdrawing the optical article from the solution, and evaporating excess liquid from the solution.

8 Claims, 7 Drawing Sheets

(51) Int. Cl.
*C01B 32/158* (2017.01)
*B05D 1/18* (2006.01)
*B05D 3/12* (2006.01)

(56) References Cited

U.S. PATENT DOCUMENTS

| | | | |
|---|---|---|---|
| 2008/0286457 | A1 | 11/2008 | Mitsuishi et al. |
| 2009/0169870 | A1* | 7/2009 | Zheng .................. C03C 17/007 428/332 |
| 2009/0207492 | A1* | 8/2009 | Horio ....................... C08J 7/042 359/507 |
| 2011/0122363 | A1 | 5/2011 | Wei et al. |
| 2012/0033175 | A1* | 2/2012 | Fukagawa .............. B82Y 20/00 351/44 |
| 2013/0022739 | A1 | 1/2013 | Biteau et al. |
| 2013/0040124 | A1* | 2/2013 | Koo ....................... C09D 11/38 428/220 |
| 2013/0095235 | A1 | 4/2013 | Bothe et al. |
| 2013/0143048 | A1 | 6/2013 | Kim et al. |
| 2014/0093661 | A1* | 4/2014 | Trajkovska .............. G02C 7/10 427/600 |

FOREIGN PATENT DOCUMENTS

| | | |
|---|---|---|
| CN | 104880745 | 9/2015 |
| CN | 104898300 | 9/2015 |
| FR | 2734827 | 12/1996 |
| JP | 2001-1288406 | 10/2001 |
| JP | 2005-255985 | 9/2005 |
| JP | 2008-224971 | 9/2008 |
| JP | 2009-202379 | 9/2009 |
| JP | 2010-271479 | 12/2010 |
| JP | 2012/14026 | 1/2012 |
| JP | 2012-530591 | 12/2012 |
| JP | 2013-205576 | 10/2013 |
| JP | 2014/48479 | 3/2014 |
| WO | WO 2009/004119 | 1/2009 |
| WO | WO 2012/108371 | 8/2012 |
| WO | WO 2013/115123 | 8/2013 |
| WO | WO 2015/137402 | 9/2015 |
| WO | WO 2015/146779 | 10/2015 |

OTHER PUBLICATIONS

Office Action issued in Corresponding Japanese Patent Application No. 2018-531488, dated Jan. 8, 2019.
Office Action issued in Corresponding Japanese Patent Application No. 2018-531488, dated Jun. 25, 2019. (English Translation).
Office Action issued in Corresponding Chinese Patent Application No. 201680073787.1, dated Jan. 28, 2019.
Office Action Issued in Corresponding Japanese Patent Application No. 2018-531488, dated Nov. 26, 2019.

* cited by examiner

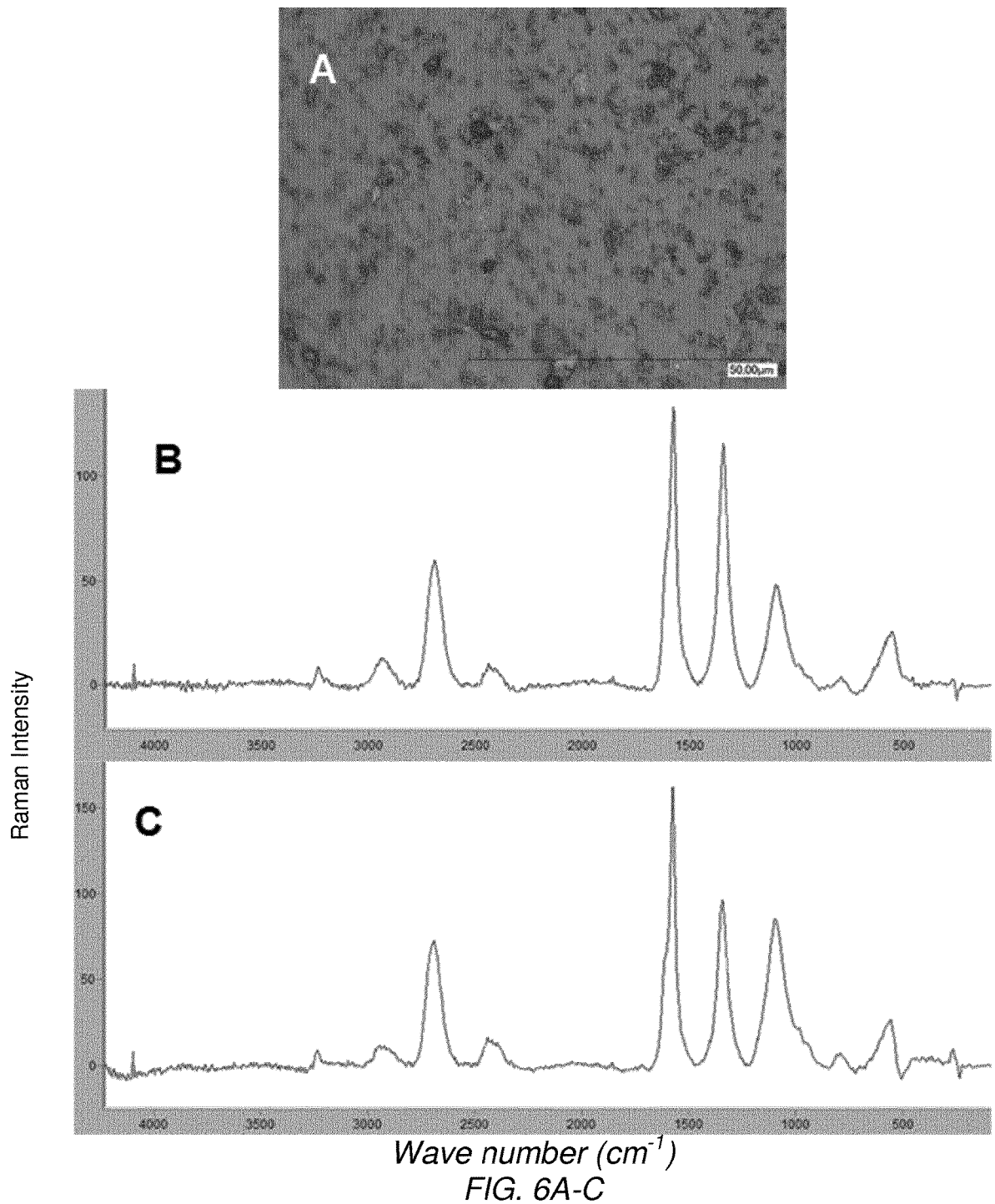
FIG. 6A-C

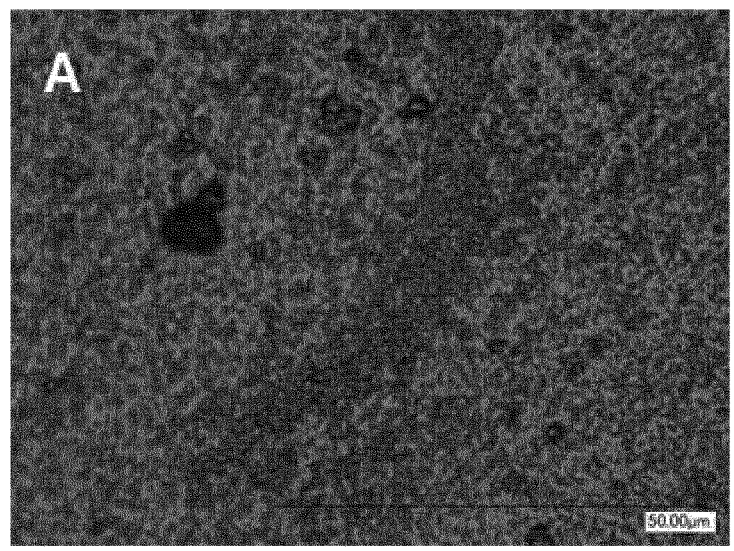
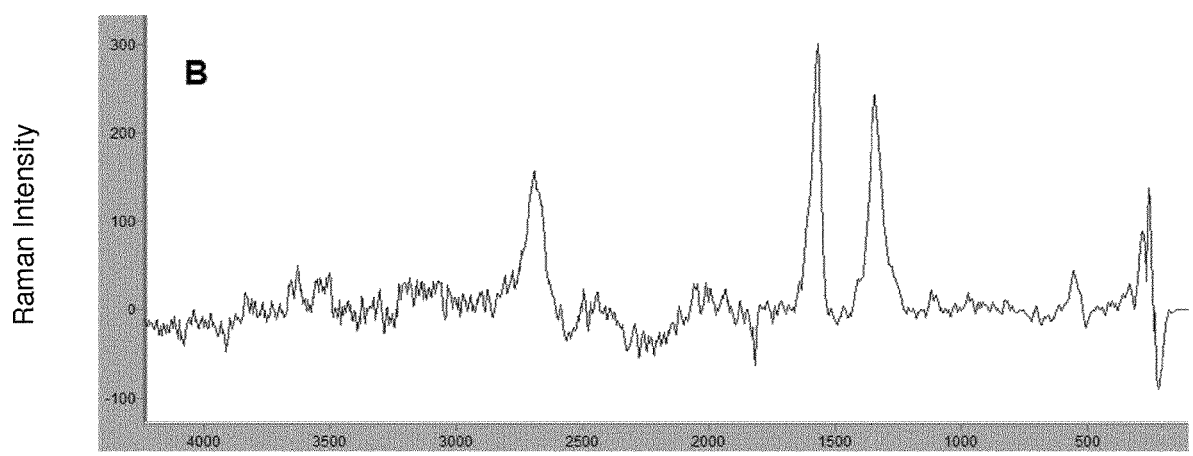
Wave number (cm$^{-1}$)
FIG. 7A-B

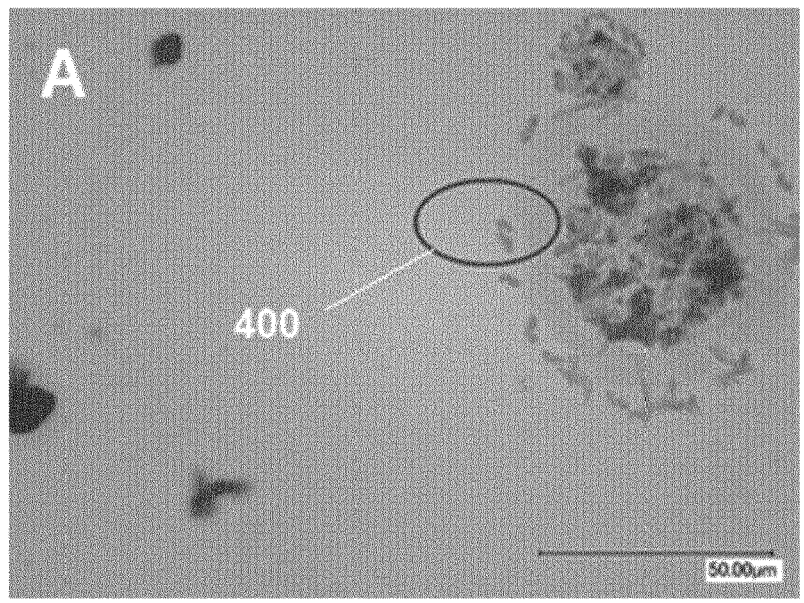
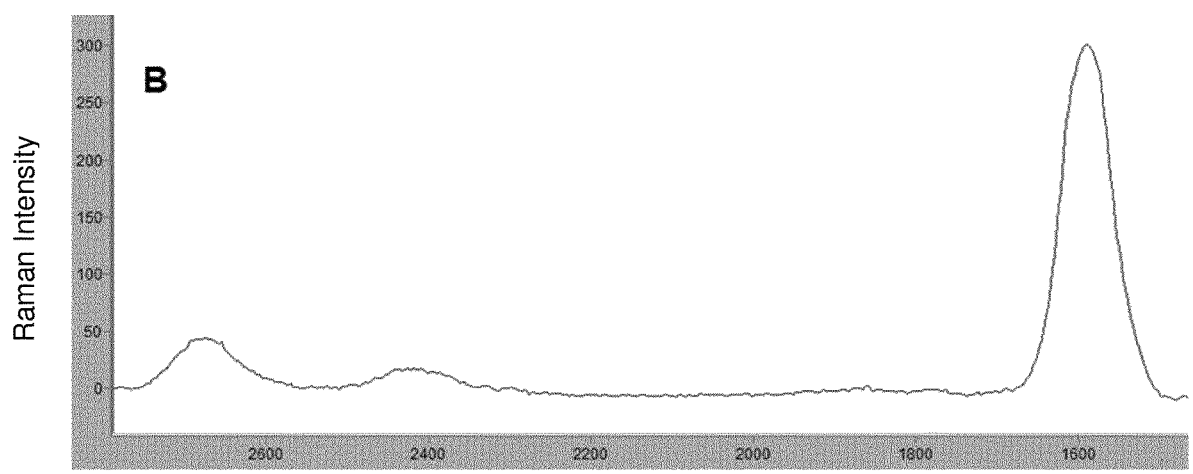
Wave number (cm⁻¹)
FIG. 8A-B

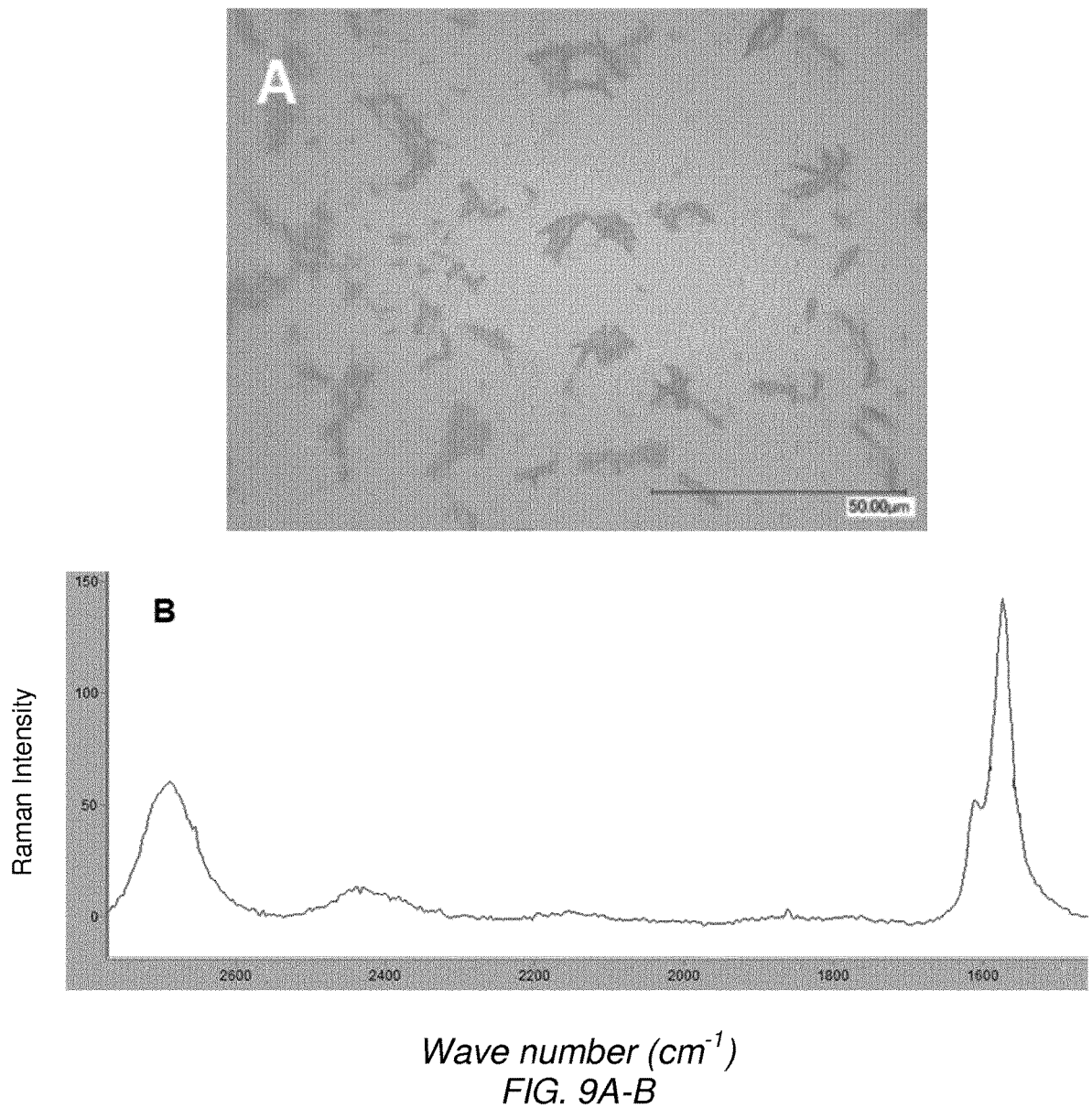
*Wave number (cm⁻¹)*
FIG. 9A-B

HARD MULTI-COAT ON OPTICAL ARTICLE

CROSS-REFERENCE TO RELATED APPLICATIONS

This application is a national phase application under 35 U.S.C. § 371 of International Application No. PCT/EP2016/081533 filed 16 Dec. 2016, which claims priority to U.S. Provisional Application No. 62/269,078 filed 17 Dec. 2015. The entire contents of each of the abovereferenced disclosures is specifically incorporated by reference herein without disclaimer.

The present disclosure relates generally to optical devices. More particularly, this present disclosure pertains to an optical article comprising at least one carbon allotrope.

BACKGROUND

Optical articles including ophthalmic lenses may comprise Hard Multi-Coats (HMCs). Such HMCs can comprise several material layers optionally capped by a top coat film. The top coat film can comprise anti-scratch coatings, anti-reflection coatings, anti-smudge coatings, hydrophobic coatings, and the like to enhance the optical performance of the optical article and also the life of the article. Existing HMCs of optical articles are commonly comprised of materials such as indium tin oxide (ITO), a transparent conducting oxide. ITO can be used in general for electro-optical applications. An ITO conductive layer can provide optically clear transparency and antistatic properties to an article. Aside from ITO, the electrically conductive layer of an optical article may comprise a metal oxide selected from tin or zinc oxide, as well as mixtures thereof or an inorganic oxide containing any one of indium, tin, zinc, and other elements or two or more of the elements. The ITO can be applied as indium tin oxide—a solid solution of indium(III) oxide ($In_2O_3$) and tin(IV) oxide ($SnO_2$), for example, 90% $In_2O_3$, 10% $SnO_2$ by weight that can be typically transparent and colorless in thin layers and can serve as a metal-like mirror in the infrared region of the electro-magnetic spectrum. Thin films of indium tin oxide are most commonly deposited on surfaces by electron beam evaporation, physical vapor deposition (PVD), and/or a range of sputter deposition techniques. Other techniques, such as, but not limited to, methods other than PVD, may be used to apply the ITO, such as, for example, chemical vapor deposition (CVD), or chemical immersion, for example. However, materials such as ITO can be disadvantageous because they can lack strength and thermal resistance, and thereby may not effectively improve the mechanical performance of a HMC.

There is a need for an alternative HMC that can provide an optically clear coating and that can provide good mechanical strength and thermal properties for optical articles, such as ophthalmic lenses. Presented herein is an optical article that comprises at least one of a substrate, a primer layer, and a HMC that comprises at least one layer. In one aspect, the HMC can comprise a plurality of layers. At least one layer of the HMC, the primer layer, or the substrate, can comprise a material that can provide good mechanical strength and thermal properties. This material can be a carbon allotrope. The carbon allotrope can be a graphene material, graphite, carbon nanotubes, fullerenes, or similar materials, or mixtures thereof. Graphene, in particular, has good mechanical strength and elasticity, as well as good electrical and thermal properties that can be advantageous for use in an optical article, particularly a HMC of an ophthalmic lens.

Carbon nanotubes (CNTs) are another type of carbon allotrope which can be used as a mechanical performance enhancer and for anti-static properties of various coatings. Such material properties of carbon allotropes may be used to provide reinforcement for even better mechanical strength and thermal resistance for improved HMCs compared to existing HMCs. Also presented herein is a method of manufacturing an optical article that comprises at least one carbon allotrope.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

SUMMARY OF THE DISCLOSURE

In one aspect, an optical device is provided which comprises an optical article having a substrate, a primer layer on the substrate, and a HMC. The HMC comprises at least one layer. At least one of the layers, the substrate, and the HMC comprises at least one carbon allotrope that is absorbed by diffusion. In another aspect, the optical article can be an ophthalmic lens.

A method of manufacturing an optical device is also provided. The method involves combining an organic solvent (e.g., heptane) and deionized (DI) water to form a solution, mixing into the solution at least one carbon allotrope, applying sonication to the solution, immersing into the solution an optical article comprising at least one of a substrate, a primer layer on the substrate, and a HMC, withdrawing the optical article from the solution, and evaporating excess liquid from the optical article.

Also presented herein is a method of making an article that involves combining and organic solvent (e.g., heptane) and deionized (DI) water to form a solution, mixing graphite into the solution, applying sonication to the solution, immersing the article into the solution, withdrawing the article from the solution, thereby coating at least a portion of the article, and evaporating excess liquid from the article.

BRIEF DESCRIPTION OF THE DRAWINGS

The advantages, nature, and various additional features as described herein will appear more fully upon consideration of the illustrative embodiments now to be described in detail in connection with the accompanying drawings. In the drawings like reference numerals denote similar components throughout the views.

FIG. 6A-C shows (A) a magnified image of a graphene coating prepared by disclosed methods and corresponding Raman spectra (B) and (C).

FIG. 7A-B shows (A) a magnified image of a graphene coating prepared by disclosed methods and (B) a corresponding Raman spectrum.

FIG. 8A-B shows (A) a magnified image of a graphene coating prepared by disclosed methods and (B) a corresponding Raman spectrum.

FIG. 9A-B shows (A) a magnified image of a graphene coating prepared by disclosed methods and (B) a corresponding Raman spectrum.

DETAILED DESCRIPTION OF THE DISCLOSURE

Figure 1:
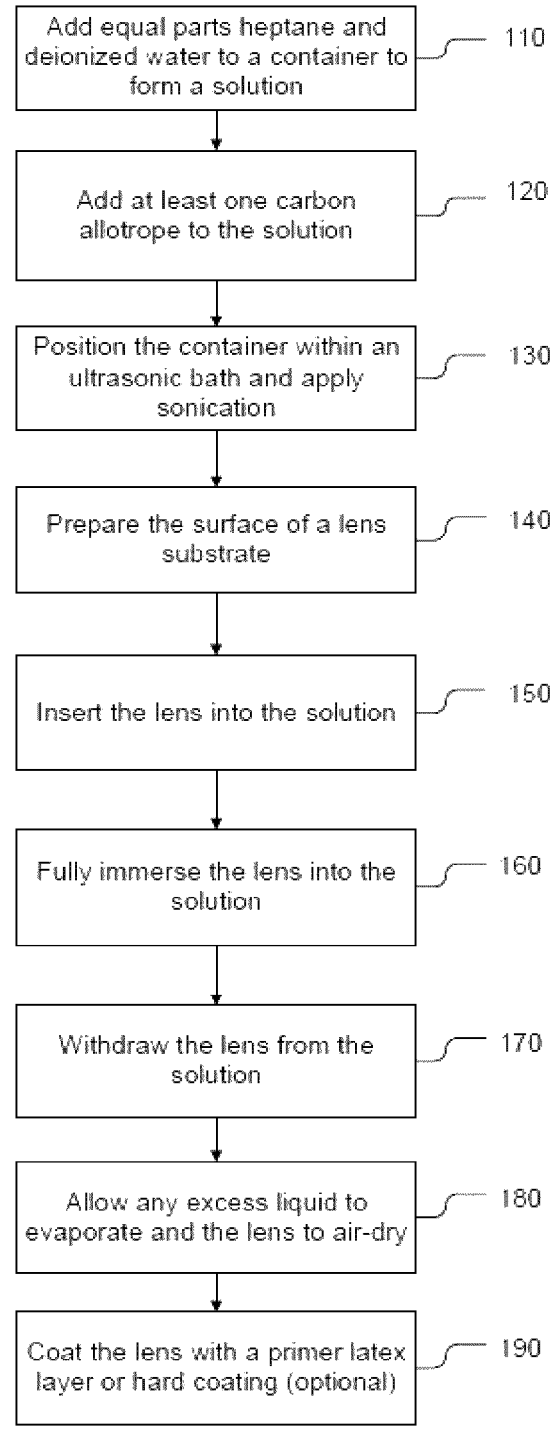
FIG. 1 illustrates a method of manufacturing an optical article comprising at least one carbon allotrope, as described herein.

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values, and including the values "a" and "b" themselves.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

Herein, the term "lens" means an organic or inorganic glass lens, preferably an organic lens, comprising a lens substrate having one or more surfaces which may be coated with one or more coatings of various natures. As used herein, "lens blank" means a transparent medium of a known base curve, with no power, used by optical laboratories, to generate a finished spectacle lens with prescribed powers; it is used for single vision, bi- and tri-focals, and progressive additional lenses (PALs). In a non-limited aspect, the methods of the present invention can be used to prepare both transparent and non-transparent (i.e., opaque) articles and devices.

The phrase "organic solvent" means any hydrocarbon-based liquid having suitable surface tension, density, and/or immiscibility in water properties for use in the current embodiments. Exemplary organic solvents include aliphatic and aromatic hydrocarbons (e.g., ether, petroleum ether, pentane, hexane, hexanes, heptane, heptanes, octane, benzene, toluene, xylenes, etc., or mixtures thereof).

An optical article and method of manufacturing the optical article is described herein, configured according to principles of the disclosure. The optical article and process used herein can be used for any type of ophthalmic lens such as a spectacle lenses, sunglasses, and the like. In a specific embodiment, the optical article can be used for the lenses of sunglasses or for solar purposes. The ophthalmic lens can be a polarized lens. The ophthalmic article can be formed of a plastic optical base which is the lens substrate or lens blank. The substrate can be a hydrophobic substrate or a hydrophilic substrate. Without being limited to theory, the present invention also includes optical devices and methods of manufacturing optical devices. Optical devices can include any device that can create, manipulate, or measure electromagnetic radiation such as, for example cameras, binoculars, microscopes, telescopes, lasers, and the like. In certain instances, an optical device can contain an optical article, such as an ophthalmic article or lens. In one illustrative embodiment, substrates such as those obtained by (co) polymerizing diethylene glycol bis allyl carbonate, sold, for example, under the trade name CR-39® by the PPG Industries company (ORMA® lenses from ESSILOR), or by polymerizing thio(meth)acrylic monomers, such as those described in the French patent application FR 2734827, or polythiourethanes, can be used. Such substrates may be obtained by polymerizing mixtures from these monomers, or they may also comprise mixtures from these polymers and (co)polymers. In other embodiments other types of suitable resin substrates may be used. The lens may comprise a HMC which can comprise at least one layer which may be conductive. More particularly, the HMC may comprise a plurality of layers, at least one of which may comprise a carbon allotrope. In some embodiments, the lens may comprise an antireflection (AR) coating that is coated on an outer surface of the HMC. The AR layer can have a multilayer configuration that includes a transparent conductive layer. In one embodiment the ophthalmic lens has a first concave surface and a second opposing convex surface.

As described above at least one layer of the HMC may comprise at least one carbon allotrope, such as graphene. Graphene is a single layer of carbon atoms arranged in a two-dimensional, atomic-scale, hexagonal lattice in which one atom forms each vertex. It is the basic structural element of other allotropes, including graphite, charcoal, carbon nanotubes, and fullerenes. Graphene can also be considered as an indefinitely large aromatic molecule, the limiting case of the family of flat polycyclic aromatic hydrocarbons. The carbon-carbon bond length in graphene is ~0.142 nm. Layers including thousands of layers of graphene make up graphite. Graphite can be characterized in several forms that individually or in combination contain unique properties. Expanded graphite usually contains fewer layers of graphene having crystalline patterns with gaps that can provide resistance to thermal damage and can cause chromatic effects. Pyrolytic graphite or pyrolytic carbon contains covalent bonding between graphene sheets due to imperfections. This type of crosslinking gives pyrolytic graphite improved thermal conductivity, room temperature diamagnetics, and UV absorption.

Graphene is about 207 times stronger than steel by weight, conducts heat and electricity efficiently, and has high optical transparency. Graphene has a tensile strength of about 130 Gpa, a Young's modulus of 1 TPA, and a thermal conductivity of 500-600 $W \cdot m^{-1} \cdot K^{-1}$. Graphene is also a semi-metal or zero-gap semiconductor, allowing it to display high electron mobility at room temperature. Due to the nanoscale size and electrical properties of graphene, it is possible for graphene to polarize light. The electrical properties of graphene may also be utilized for anti-static lens properties. In contrast to ITO, graphene is more flexible and capable of withstanding high stress. Single-layer graphene has an absorption rate of 2%, but it is possible to see it under a light microscope on $SiO_2$/Si, due to interference effects. Thus, the optical, mechanical, thermal, and electrical properties of the graphene are desirable for incorporating in at least one of the substrate, a primer layer, and the HMC of an ophthalmic lens.

The graphene that is used herein for the HMC may be prepared by exfoliation, chemical vapor deposition (CVD), graphite dispersion or other methods known in the art before it is incorporated into or on at least one layer of a HMC, the primer layer, or the substrate. CVD is advantageous because it permits the growth of graphene on metal catalyst-patterned substrates. In the graphite dispersion method graphene can be prepared in liquid-phase. During this process graphite is dispersed in an organic solvent having nearly the same surface energy as graphite itself to produce a solution. The solution is then sonicated in an ultrasound bath, or a voltage can be applied to the solution in order. After the dispersion, the solution is then centrifuged in order to dispose of any thicker graphite flakes that remain. This method is useful for preparing larger amounts of graphene compared to other graphene production methods and allows for upscaling of graphene production for industrial uses.

Graphene can be incorporated into any one of a primer latex layer of an ophthalmic lens, for example, or the HMC layer itself, or the substrate, through diffusion, to reinforce the mechanical properties of the HMC, primer layer, or substrate. The primer layer is typically coated on the outer surface of the substrate, and the HMC is then coated onto the primer layer. The incorporation of graphene into at least one portion of an ophthalmic lens, as described, can be used to alter or effect a change in the index of refraction of the optical surface of the lens, if desired. In one embodiment, graphene may be applied to an outer surface of the substrate prior to coating the substrate with a HMC or other coatings, as described herein. Upon contact with at least a portion of the ophthalmic lens the graphene is allowed to diffuse into any one of the substrate, primer layer, or HMC in a uniform manner using the method of applying graphene to the ophthalmic lens described herein. The graphene that can be used in the ophthalmic lens described herein can be ultra-fine graphene. For example, the graphene can be in the form of a nanoparticle powder, each nanoparticle having an average size of about 0.25 µm.

In an exemplary embodiment, a carbon allotrope, such as graphene, is incorporated into or on at least one layer of the HMC, the primer layer, and the substrate. The layer comprising graphene can be less than about 0.1 µm thick. One of skill in the art will realize that other thicknesses of the layer comprising the carbon allotrope can be contemplated. In other embodiments, the thickness of the layer comprising graphene can vary from about 0.1 nm to about 150 nm, and more particularly from about 0.1 nm to about 50 nm, depending on the nature of the layer. When the layer comprising the carbon allotrope is less than about 0.1 nm thick, the layer comprising the carbon allotrope may not have sufficient electrical conductivity. When the conductive layer is more than about 150 nm thick, the layer comprising the carbon allotrope may not typically enable the required transparency and low absorption characteristics of an ophthalmic lens. More particularly, the thickness of the layer comprising a carbon allotrope, such as graphene, can vary from about 0.1 nm to about 30 nm, more particularly, from about 1 nm to about 20 nm, and even more particularly, from about 1 nm to about 10 nm. The layer comprising the carbon allotrope can be comprised of a substantially uniform thickness.

In one exemplary embodiment, the carbon allotrope, such as graphene, may be doped before it is applied to the ophthalmic lens, or it may remain un-doped. The advantage of doping the graphene before is it applied to at least a portion of the lens is that the electronic properties and chemical reactivity of the grapheme can be tailored. Although graphene has many advantageous properties, as described above, doping the graphene can be desirable to modify some properties of graphene such as, for example, zero-bandgap and high sheet resistance properties. The conductivity of the graphene layer may be lower if it is not doped, but an un-doped graphene layer can still be substantially effective to provide anti-static properties and other desirable thermal, mechanical, and electrical properties to an ophthalmic lens.

The graphene can be doped through a direct synthesis method or a post treatment method. The direct synthesis method involves doping the graphene during the graphene synthesis, such as, for example, during CVD of graphene. The graphene can also be doped during a post treatment step after the graphene synthesis. Post treatment doping of graphene can involve wet doping or dry doping. Wet doping of graphene can be achieved by acid treatment, metal chloride treatment, and organic material coating on the graphene surface using dip coating or spin coating of a dopant-containing solution. Dry doping can be achieved by electrostatic field formation, deposition by evaporation, thermal treatment, plasma treatment, and the like. Charge transfer doping is achieved by exchanging electrons between dopants and graphene by transferring electrons from graphene to dopants (p-type graphene) or from dopants to graphene (n-type graphene). Thus, the electronic properties and other properties of the graphene can be modified by controlling the doping parameters such as dopant species, concentration, and by using appropriate doping methods. Different doping methods could be combined to further control the desired effects.

The morphology, structure, and quality of a HMC layer, primer layer, or the like, comprising graphene can be evaluated using techniques, such as, but not limited to, scanning electron microscopy (SEM), high-resolution transmission electron microscopy (HRTEM), Raman Spectroscopy, optical reflectivity, optical microscopy, low-energy electron microscopy (LEEM), low-energy diffraction (LEED), atomic force microscopy (AFM), transmission electron microscopy (TEM), scanning tunnelling microscopy (STM), photoelectron microscopy (PES), angle-resolved photoelectron spectroscopy (ARPES), photoemission electron microscope (PEEM), X-ray photoelectron spectroscopy (XPS), Image J data analysis software, reflection high-energy electron diffraction (RHEED), or microsope-based videography. UV-VIS can be used for measuring optical transmittance. Ellipsometry can be used to test the thickness of the graphene.

Other examples of carbon allotropes that could be used in the ophthalmic lens instead of graphene could be carbon nanotubes (CNTs), for example. Carbon nanotubes, also called buckytubes, are cylindrical carbon molecules with properties that make them potentially useful in a wide variety of applications (e.g., nano-electronics, optics, materials applications, etc.). They exhibit extraordinary strength, unique electrical properties, and are efficient conductors of heat. Inorganic nanotubes have also been synthesized. A nanotube is a member of the fullerene structural family, which also includes buckyballs. Whereas buckyballs are spherical in shape, a nanotube is cylindrical, with at least one end typically capped with a hemisphere of the buckyball structure. Their name is derived from their size, since the diameter of a nanotube is on the order of a few nanometers, while they can be up to several centimeters in length. The carbon nanotubes can be in the form of either single-walled nanotubes (SWNTs) or multi-walled nanotubes (MWNTs). MWNTs can provide ophthalmic lenses with improved mechanical strength. In other instances, the carbon allotrope can include disc-shaped nano-graphene (DSNG), multi-layer graphene (MLG), single-layer graphene (SLG), and/or multi-walled nanohorns (MWNHs). MWNHs can offer ophthalmic lenses with improved electrical conductivity. Without being limited to theory, any of the disclosed carbon allotropes including can be included in the ophthalmic lenses of the present invention. In some aspects, any of these carbon allotropes may be used as a fortifier to benefit the resultant properties of the final ophthalmic lens.

Fullerenes are a class of carbon allotropes in which carbon takes the form of a hollow sphere, ellipsoid, or tube. This class of materials includes carbon nanotubes, buckyballs, and nanobuds. Other materials that could be used with the lens could be gold nanoparticles or gold nanotubes (shells, spheres, rods, etc.). Yet other types of carbon allotropes that could be used include metal-reinforced carbon allotropes, such as, but not limited to, metal-graphene nanocomposites and carbon nanotube metal matrix composites (CNT-MMCs), for example.

In another embodiment, the carbon allotrope of the current invention can include transparent graphene. The transparent graphene can be that as prepared in U.S. Pat. No. 8,722,442 hereby incorporated by reference. A topcoat layer of transparent graphene applied to the optical articles of the current invention can provide an article surface having improved superhydrophobic or oleophobic properties by means of the lotus effect. The lotus effect describes the self-cleaning properties that are a result of ultrahydrophobicity as exhibited by the leaves of the lotus flower. It is also anticipated in the current embodiments, that a transparent graphene containing ophthalmic lens may have improved superhydrophobic or oleophobic, self-cleaning, or anti-static properties that may also be tuned individually or in concert with other carbon allotropes by the methods described herein.

As illustrated in FIG. 1, disclosed herein is a method of manufacturing an optical article comprising at least one carbon allotrope, such as, but not limited to, graphene, graphite, carbon nanotubes, fullerenes, and mixtures thereof, as described herein. The manufacturing process used to manufacture the optical article is a dip-coating process similar to that disclosed in US Patent Publication No. 20130022739, incorporated herein by reference. The process may be modified and adapted, if desired. This process involves a first step 110 of adding equal parts an organic solvent (e.g., heptane) and deionized (DI) water to a container to form a solution. The solution can be housed in a tank or other container. The ratio of heptane to DI water can be adjusted, as desired. In one embodiment a minimum amount of heptane can be used for optimum results.

The process then involves a next step 120 of adding at least one carbon allotrope to the solution. More particularly, this step may involve mixing into the solution a small amount of ultra-fine natural flake graphite powder. For example, 1 gram of graphite powder per 1000 ml may be used. Various forms of ultra-fine graphite powder can be tested to determine which form is the best quality. Following this, the process involves a next step 130 of positioning the container holding the solution into an ultrasonic bath and applying mild sonication, for example, from about 5 seconds to about 10 seconds at full power. The mild sonication used in this step causes thin layers of graphene to assemble at the heptane/water interface of the solution. This step is followed by the step of 140 preparing the surface of an optical article such as an ophthalmic lens substrate. The surface of the substrate may be prepared or modified to be hydrophobic or hydrophilic before it is immersed into the solution, if desired. In one embodiment, it is important for the substrate to be hydrophilic. If the substrate or HMC is not sufficiently hydrophilic, a surface treatment or application of a hydrophilic silane, for example, may be applied to the surface of the substrate or HMC to achieve the desired results. The hydrophilic properties of the outer surface of the substrate or the HMC are critical for facilitating the adherence of graphene to the substrate during the dip-coating process. The effects of various hydrophilic surfaces as well as methods to increase or decrease hydrophilicity could be varied, as desired.

The process then involves a step 150 of inserting the ophthalmic lens into the solution and thereafter the step 160 of fully immersing the ophthalmic lens into the solution for between about 5 minutes and about 10 minutes. In order to enable the ophthalmic lens to be completely and securely immersed into the solution, the ophthalmic lens is releasably attached to a slow-pull or dip-coating apparatus. In one aspect the ophthalmic lens can be immersed into the solution at a constant speed. The slow-pull or dip-coating apparatus is used to keep the ophthalmic lens in place and to ensure that the surface of the substrate, the primer layer, or the HMC is evenly coated with a substantially uniform coating comprising the at least one carbon allotrope, such as graphene.

The process then involves the step 170 of withdrawing the ophthalmic lens from the solution by activating the slow-pull or dip-coating apparatus. The speed at which the ophthalmic lens is removed from the solution can be adjusted, as desired. The rate of speed of the ophthalmic lens removal can range from about 0.1 mm/sec to about 10 mm/sec. In one aspect the ophthalmic lens can be withdrawn at a speed of about 0.7 mm/sec. The speed settings of the slow-pull or dip-coating apparatus may be varied to achieve the desired results. As the ophthalmic lens is withdrawn from the heptane/water interface of the solution, graphene accumulates on the surface of the substrate, primer layer, or HMC of the ophthalmic lens and forms a thin layer of graphene by deposition on the surface of the substrate, primer layer, or HMC while it is withdrawn from the solution. After the graphene is applied to the at least a portion of the ophthalmic lens as a coating, the graphene is allowed to diffuse into the ophthalmic lens. The rate of diffusion of graphene into any part of the lens, for example, the substrate, primer, or HMC, can be determined by the polar properties of material into which the graphene is diffusing. In one embodiment the withdrawal of the ophthalmic lens from the solution is carried out at a constant speed to avoid any irregularities in the coating of the ophthalmic lens and to ensure that the ophthalmic lens is substantially evenly coated with at least one graphene layer. The speed of withdrawal determines the thickness of the coating. A faster withdrawal gives a thicker coating material. The temperature and concentration of the solution as well as the rate of immersing and withdrawing the ophthalmic lens from the solution can all be controlled by a user to achieve the desired results.

After the ophthalmic lens is completely withdrawn from the solution, the process involves the step 180 of evaporating any excess liquid that remains on the ophthalmic lens by allowing the excess liquid to drain from the ophthalmic lens and letting the ophthalmic lens air-dry, but in some aspects not to dryness if the lens is chosen to be hard coated. The lens should still be wet in order to allow good diffusion of the graphene into the hard coating. During this evaporation step solvent may evaporate from the liquid, forming a thin layer. The evaporation step can be carried out in a low humidity environment. This environment can help to increase the speed at which the excess liquid is evaporated. For volatile solvents, such as alcohols, some evaporation may begin during the deposition or coating step. In one optional step 190, after the evaporation step, the ophthalmic lens can be coated with primer latex or a hard coating using a dip hard coating process. In one aspect the process can be a continuous process, and the steps can be carried out directly after each other. To avoid removing any part of the graphene layer from the ophthalmic lens, the process does not involve any washing steps.

In one exemplary embodiment a polarizing effect on the ophthalmic lens may be achieved. The polarization of the lens may also cause a shearing effect to be achieved. To accomplish a polarizing effect, as a first step, using the process described herein, one or more layers of graphene may be coated onto the surface of substrate, primer layer, or HMC such that the layers are positioned such that they are parallel or horizontal in relationship to the surface, thereby forming a first set of graphene layers. A "first set" of graphene layers can mean one or more layers of graphene. The layers are then allowed to air-dry, but may be fragile. To protect the one or more graphene layers, the layers can be coated with a primer to encase the one or more graphene layers.

The ophthalmic lens is then turned 90 degrees relative to the horizontal surface of the solution, and the graphene coating process is repeated, as described above, such that successive layer(s) of graphene that may form a "second set" of graphene layers that are positioned perpendicularly or vertically relative to or in relationship to the first set of graphene layers, thereby forming a second set of graphene coatings.

In addition to the invention disclosed herein being useful for the improvement of optical articles such as an ophthalmic lens, the invention disclosed herein can also be used for many applications outside of the optical industry, for example, electro-optical applications for other types of coatings. For example, in some embodiments thick layers of graphene or multiple layers of graphene may no longer provide optical transparency, but they may have other uses that take advantage of graphene's strength and unusual electrical properties. Thus, the manufacturing process described herein can be valuable for other industries, for example electronic devices, such as touch screens. In one example, the process described herein can be used to make articles other than ophthalmic lenses. For example, the method can involve combining heptanes and deionized water to form a solution, mixing at least one carbon allotrope such as graphite into the solution, applying sonication to the solution, immersing the article into the solution, withdrawing the article from the solution, thereby coating at least a portion of the article, and evaporating excess liquid from the article.

The particular examples disclosed above are illustrative only, as the present invention may be modified and practiced in different but equivalent manners apparent to those skilled in the art having the benefit of the teachings herein. It is, therefore, evident that the particular illustrative examples disclosed above may be altered or modified and all such variations are considered within the scope of the present invention.

The various elements or steps according to the disclosed elements or steps can be combined advantageously or practiced together in various combinations or sub-combinations of elements or sequences of steps to increase the efficiency and benefits that can be obtained from the invention.

It will be appreciated that one or more of the above embodiments may be combined with one or more of the other embodiments, unless explicitly stated otherwise.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

EXAMPLES

The present invention will be described in greater detail by way of specific examples. The following examples are offered for illustrative purposes only, and are not intended to limit the invention in any manner. Those of skill in the art will readily recognize a variety of noncritical parameters, which can be changed or modified to yield essentially the same results. For instance, any substrate used for the preparation of an optical article can be used in the following examples.

Graphene nanopowder (1-2 nm) was obtained from SkySpring Nanomaterials, Inc. Houston, Tex. Raman Spectroscopy was performed on a Thermo Electron Nicolet Almega XR Dispersive Raman Spectrometer with a 532 nm laser and 0.6 mm spot size.

Graphene coated lens were prepared according to following steps. The resulting lenses contained one or more benefits and/or improvements including improved mechanical performance (e.g., ISTM and Sand Bayer), antistatic properties, hydrophobic and oleophobic properties, polarization and wavelength isolation properties, improved thermal properties, and/or anti-microbial properties.

1. Lens Pre-Treatment

Lenses were first cleaned by a dip coating process and then coated with 1 micron of primer, either A415 by a dip method or A722 by a spin method. Thereafter, the lens surface was treated to increase surface energy until comparable to that of glass for CAS (carbon allotrope solution) adhesion during a drain method coating step by either a) coating the primed lens with 100-400 nm of $SiO_2$ at a rate of 0.8 to 1.4 nm/s by PVD under vacuum (0.003 Pa) with no passive gases; b) exposing the primer layer to corona discharge, plasma, or ion treatment; or c) a combination of both a) and b).

2. Graphite Exfoliation

Figure 2:
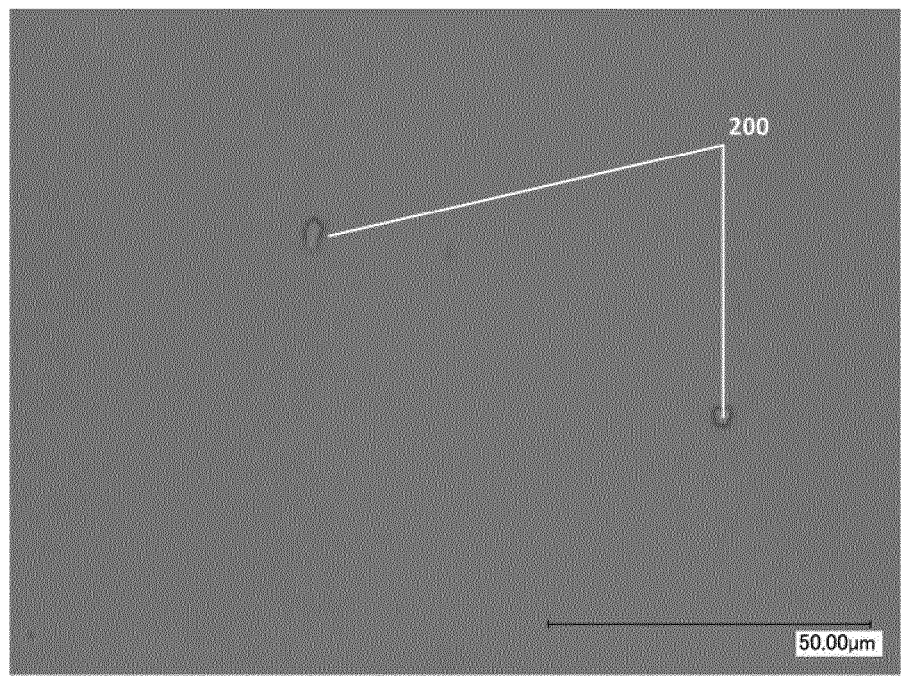
FIG. 2 shows a magnified image of multilayer graphene.

Suspended pristine graphite nanopowder (50 mg per 100 mL of heptane) was mixed thoroughly by hand in a poly bottle. NaOH (10 mg per 1 mg of graphite) was then added and the bottle was placed on a vibration table for 2 minutes and further ultra-sonicated until homogenous (e.g., 60 to 180 minutes). After sonication was complete the mixture was quickly transferred into centrifuge vials and centrifuged for 10 minutes at 3500 rpm. The supernatant was then transferred into a new poly bottle and stored at room temperature until needed. The mixture should be ultra-sonicated for 10 minutes before use to ensure homogeneity. FIG. 2 depicts a magnified image (2500×) of an exfoliation batch centrifuged for 60 minutes to remove most of the graphite products leaving isolated multilayer graphene 200.

3. Graphene Refinement

Figure 3:
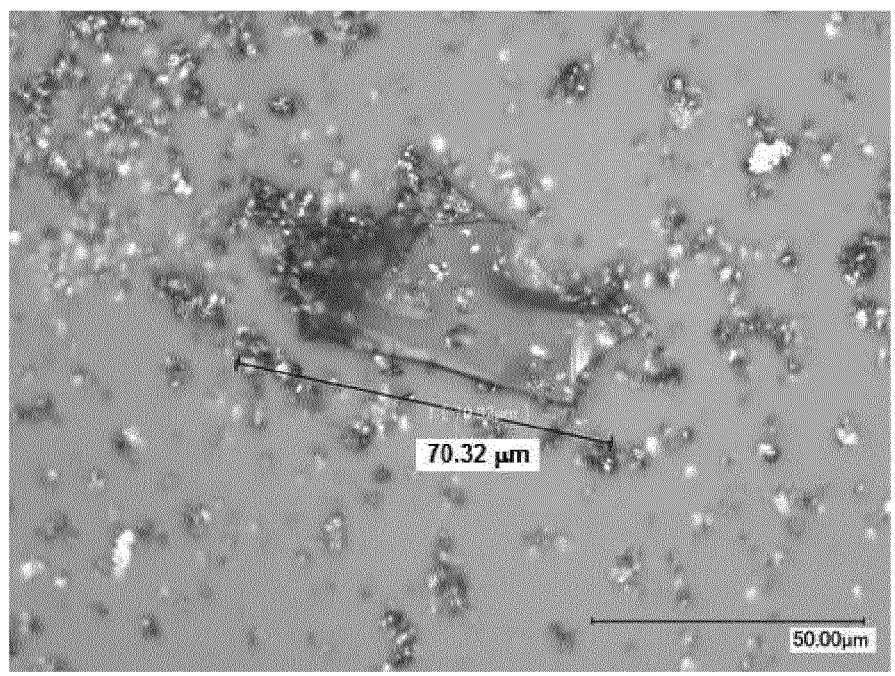
FIG. 3 shows a magnified image of graphene formed by shear refinement.
Figure 4:
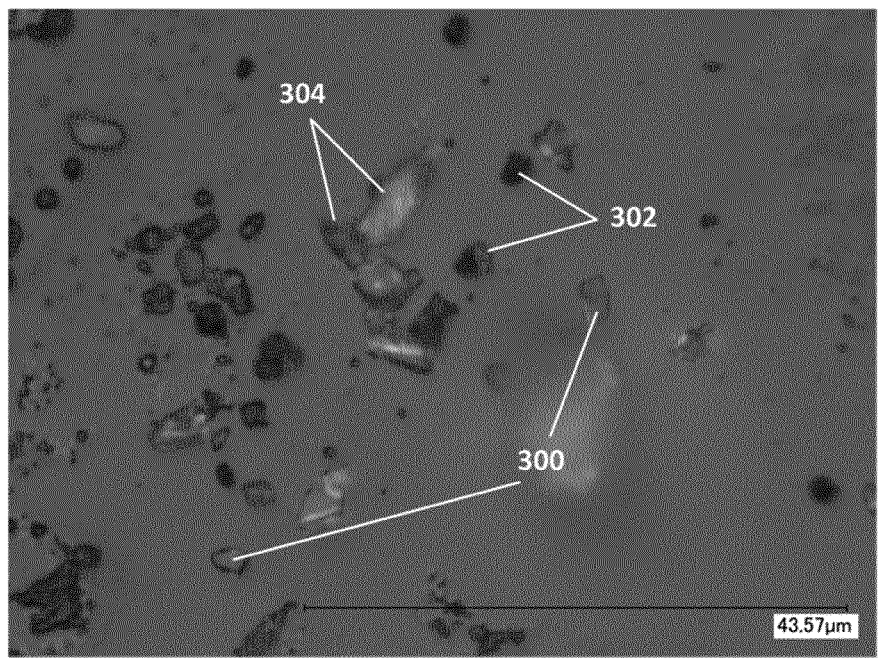
FIG. 4 shows a magnified image of typical shear refinement.

A portion of the homogeneous mixture from graphite exfoliation was added to a first beaker containing heptane and water (1:4 vol/vol) just above the solvent interface so the graphite mixture ratio was 1 mL per 10 mL of heptane. The beaker was then sonicated for 60 minutes and then allowed to settle for 60 minutes. A glass slide was submerged perpendicularity in the bath and slowly, removed at 0.7 mm/s, and immediately but slowly immersed perpendicular to the liquid surface in a second beaker containing heptane and water (1:4 vol/vol) to shear the graphite layer from the slide into the solvent interface. Multiple slides (e.g., 4-6) were usually required to fill the interface with graphite. The second beaker was then sonicated for 60 minutes and allowed to settle for 60 minutes. Next, clean glass slides were immersed in the second beaker slowly, removed at 0.7 mm/s, and immediately but slowly immersed perpendicular to the liquid surface in a third beaker containing heptane and water (1:4 vol/vol) to shear the graphite layer from the slide into the solvent interface. The third beaker was then sonicated for 60 minutes and allowed to settle for 60 minutes. The material in the solvent interface of the third beaker was carbon allotrope solution (CAS). The CAS was then either removed by glass slide or pipette and placed into the solvent interface of the CAS coating tank. FIG. 3 depicts a magnified image (2000×) of graphene formed by shear refinement. FIG. 4 depicts a magnified image of graphene 200, graphite 202, and expanded graphene 204 formed by shear refinement.

4a. Drain Method Coating Process

Figure 5:
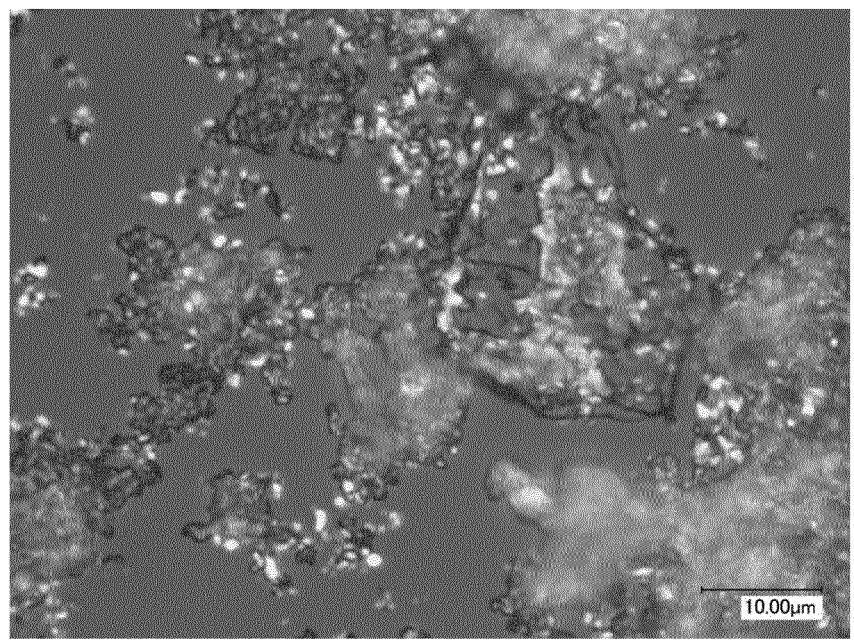
FIG. 5 shows a magnified image of large clusters of expanded and pyrolytic graphite.

A lens was added to a bath of heptane and DI water (1:4 vol/vol) convex side up to the water phase. CAS was then added to the heptane/water interface by shearing of a glass slide or by pipette. The bath was then ultra-sonicated for 5 minutes to orient the graphene into the interface and force any contaminants into the water. The bath was drained so that the interface layer, parallel to the lens, recedes and moves across the lens at a rate of 0.7 mm/s until the heptane layer is below the lens. At that point, the CAS coated lens was quickly transferred to a hard coating step. If allowed to dry the lens will not diffuse into the hard coating properly. FIG. 5 depicts a magnified (5000×) image of a glass lens prepared by the drain method showing large clusters of expanded and pyrolytic graphite.

4b. Slow-Pull Coating Process

A lens was added to a bath of heptane and DI water (1:4 vol/vol) to the water phase. CAS was then added to the heptane/water interface by shearing of a glass slide or by pipette. The bath was then ultra-sonicated for 5 minutes to orient the graphene into the interface and force any contaminants into the water. The lens was then pulled up through the CAS layer, perpendicular to the layer, at a rate of 0.7 mm/s, through the heptane layer, and out of the bath. At that point, the CAS coated lens was quickly transferred to a hard coating step. If allowed to dry the lens will not diffuse into the hard coating properly.

5. Hard Coating and Curing

A wet CAS coated lens was immersed into a hard coating at a designated slow pull coating speed. During immersion, the CAS layer was sheared off and remained upon the surface of the hard coating liquid. It was important that part of the lens was not immersed, such as the side of the lens, or the CAS layer would completely disconnect from the lens that could be difficult to realign. The lens was then slow pulled out of the hard coating at a rate correlating to the desired hard coating thickness. The speed should be the same as the entry speed. The slow pull speed was typically between 0.5 to 3 mm/s. As the lens was being slow pulled, the CAS layer will recollect on top of the hard coating layer. Within seconds, the CAS layer will diffuse into the hard coating. Once the lens has completely cleared the hard coating, the lens can be cured at 100° C. for 3 hours. A phenomenon was noticed during curing of CAS alone; different types (e.g., graphene, graphite, expanded graphite, pyrolytic graphite) and ratios of allotropes were created depending on the curing speed. For example, flash drying tends to create much more crystallized product like pyrolytic graphite and nano-graphene. It is anticipated that the speed of hard coating curing could affect the carbon allotropes created as well.

6. Characterization

Graphene coatings were characterized under microscope and by Raman Spectroscopy. The Raman peak height (i.e., intensity), width, location, and shape can indicate important structural features of a given sample. A Raman spectrum of a graphene sample can contain a peak near 1350 cm$^{-1}$ referred to as the D-mode. An increase in intensity represents an increase in disorder (e.g., pristine graphene has no D-mode). A peak near 1583 cm$^{-1}$ can be referred to as a G-band. The height and width of the G-band reveal strain in the sample (e.g., a narrow and tall peak is desired). A D$^1$-bank peak can appear near 1620 cm$^{-1}$ if contaminants are present in the sample. All graphitic samples have a 2D-band near 2680 cm$^{-1}$. The shape and height of the 2D-band can be used to determine the approximate number of graphene layers in the sample. The number of layers of graphene can be estimated based on the value of I(G)/I(2D). For instance, I(G)/I(2D)=0.2 or less is equal to one layer; I(G)/I(2D)=1 is equal to 10 layers; and increased layers can be estimated based on published Raman measurements of graphite, HOPG, and graphene.

The prepared graphene coatings exhibited a range of carbon allotropes and ratios could be adjusted by altering the exfoliation, refinement, and drying steps. The following carbon allotropes were identified by Raman Spectroscopy and/or microscope: expanded graphite, pyrolytic graphite or pyrolytic carbon, disc-shaped nano-graphene (DSNG), multi-layer graphene (MLG), single-layer graphene (SLG), and/or multi-walled nanohorns (MWNH), multi-walled nanotubes (MWNT), and/or single-walled nanotubes (SWNT).

FIG. 6A depicts a magnified image of a glass slide prepared from graphene nanopowder exfoliated by 60 minute ultrasonication and four passes of surface interface refinement, coated by drain method and air dried. FIG. 6B depicts a Raman spectrum of a dark area in FIG. 6A. A 2D-Band is found at 2683 cm$^{-1}$ with relative intensity of 59.7 and a G-band is found at 1579 cm$^{-1}$ with relative intensity of 133 to give a I(G)/I(2D)=2.27 and approximately 39 layers of graphene. The strong D-Band is a sign of a highly ordered structure but with many defects. The spectrum shows a combination of pyrolytic graphite, multi-layer graphene (damaged), and possibly multi-walled carbon nanohorns and tubes. FIG. 6C depicts a Raman spectrum of a light area in FIG. 6A. A 2D-Band is found at 2688 cm$^{-1}$ with a relative intensity of 72.4 and a G-band is found at 1576 cm$^{-1}$ with a relative intensity of 164.4 to give a I(G)/I(2D)=2.24 and approximately 33 layers of graphene. The spectrum shows a combination of pyrolytic graphite, multi-layer graphene (damaged), and possibly multi-walled carbon nanohorns and tubes. The light area of the sample has slightly better order and less damage than black area of sample.

FIG. 7A depicts a magnified image of a glass slide prepared from graphene nanopowder exfoliated by 60 minute ultrasonication and two passes of surface interface refinement, coated by drain method and air dried. FIG. 7B depicts a Raman spectrum of a light area in FIG. 7A. A 2D-Band is found at 2690 cm$^{-1}$ with a relative intensity of 156.2 and a G-band is found at 1572 cm$^{-1}$ with a relative intensity of 299.2 to give a I(G)/I(2D)=1.91 and approximately 28 layers of graphene. The spectrum is similar to the spectrum in FIG. 6C but with fewer graphene layers and improved structure.

FIG. 8A depicts a magnified image of a glass slide prepared from graphene nanopowder exfoliated by 60 minute ultrasonication with NaOH (5 mg/1 mL of heptane), centrifuged for 60 minutes at 3500 rpm, decant of supernatant pipette dripped on glass slide and dried at 40° C. oven for 30 minutes. FIG. 8B depicts a Raman spectrum of FIG. 8A. A 2D-Band is found at 2690 cm$^{-1}$ with a relative intensity of 156.2 and a G-band is found at 1590 cm$^{-1}$ with a relative intensity of 300.9 to give a I(G)/I(2D)=1.92 and approximately 28 layers of graphene. The spectrum shows a mixture of carbon allotropes, however the G-band shape and location imply improved graphene layer structure.

FIG. 9A depicts a magnified image of a glass slide prepared from graphene nanopowder exfoliated by 60 minute ultrasonication with NaOH (5 mg/1 mL of heptane), centrifuged for 60 minutes at 3500 rpm, decant of supernatant pipette dripped on glass slide and fast dried at 200° C. oven for 15 seconds. FIG. 9B depicts a Raman spectrum of FIG. 9A. A 2D-Band is found at 2688 cm$^{-1}$ with a relative intensity of 50.5 and a G-band is found at 1574 cm$^{-1}$ with a relative intensity of 141.6 to give a I(G)/I(2D)=2.79 and approximately 42 layers of graphene. The spectrum shows a mixture of pyrolytic graphite and DSNG (Disc-shaped nano graphene) due to G-Band shape and the new location of the 2D-band peak compared to other samples. The shoulder near 1600 cm$^{-1}$ is a D$^1$-band peak representing impurities.

The process was found to create a few other carbon allotropes of value. Modification of the exfoliation technique, refinement process, and CAS layer drying was unexpectantly found to affect the quality and quantity of these materials Pyrolytic graphite or pyrolytic carbon is a strong room temperature diamagnetic material. Pyrolytic graphite contains graphene sheets crystallized in planar order resulting in unique thermal and mechanical properties. Pyrolytic graphite has been used to reinforce and improve thermal properties of plastic. Production of pyrolytic graphite typically requires high temperatures, making the current method potentially valuable as a "cold" process. Additional refinement steps can increase the quantity of pyrolytic graphite. Faster drying/curing times of the CAS layer increases the quality of pyrolytic graphite Expanded graphite or intumescent flake graphite can be prepared by adding intercallant material in between the graphene sheets of graphite. Expended graphite can be used as a filler material, such as to provide conductive, fire resistant, and radiation shielding properties to materials. Reduction of refinement steps and/or elimination of centrifuge steps increases the amount of expanded graphite. The addition of intercallant materials may also increase quantity and quality.

Small quantities of single and multi-walled nanotubes and horns were found to formed during the refining step. These allotropes have beneficial properties, such as UV absorption, electrical conductivity, etc. Increased quantities of nanotubes and horns appears to be connected to long ultrasonic process times.

7. Performance Testing

Performance testing was conducted with using Orma lenses processed with 150 nm of SiO$_2$ by vacuum chamber, drain method CAS layer, and approximately 3.50 microns of Altius eM hard coating.

a) Mechanical Performance.

Adhesion Testing via Cross-Hatch: Passed.

Sand Bayer: 3.81 (average), 7% improvement over control.

b) Anti-Static Performance

Plasma Ball testing: 50% pass rate.

c) Optical Performance

Transmission: 90.5%, 2% reduction from control.

Haze: 0.61, a 0.31 increase from control

What is claimed is:

1. An optical device comprising: an optical article having a substrate, a primer layer on the substrate, and a hard multi-coat (HMC), wherein the HMC comprises at least one layer, and wherein at least one of the layers, the substrate, and the HMC comprises graphene nanoparticles, each nanoparticle being about 0.25 μm, absorbed by diffusion, and wherein the graphene nanoparticles are present as a uniform coating on a layer surface.

2. The optical device of claim 1, wherein the optical article is polarized.

3. A method of manufacturing an optical device of claim 1 comprising: combining an organic solvent and deionized water to form a solution; mixing into the solution the graphene nanoparticles, each nanoparticle being about 0.25 μm; applying sonication to the solution; immersing into the solution the optical article comprising at least one of a substrate, a primer layer on the substrate, and a hard multi-coat (HMC); withdrawing the optical article from the solution; and evaporating excess liquid from the optical article.

4. The method of claim 3, wherein the step of withdrawing further comprises withdrawing the optical article from the solution at a constant speed.

5. The method of claim 3, wherein the method further comprises: during the step of withdrawing, diffusing the graphene nanoparticles into at least one of the substrate, the primer layer, and the HMC.

6. The method of claim 3, wherein the method further comprises during the step of withdrawing, coating at least one of an outer surface of at least one of the substrate, the primer layer, and the HMC with at least a first layer comprising graphene nanoparticles.

7. The method of claim 6, wherein the method further comprises coating the at least a first layer comprising graphene with a primer layer.

8. The method of claim 7, wherein the method further comprises: immersing the optical article into the solution such that the optical article is positioned at a substantially 90 degree angle to a horizontal surface of the solution, and withdrawing the optical article from the solution such that at least a second layer comprising graphene nanoparticles is diffused into at least one of the substrate, the primer layer, and the HMC in a substantially perpendicular position relative to the first layer comprising graphene nanoparticles to form a polarized article.

\* \* \* \* \*